United States Patent
Pyron et al.

[11] Patent Number: 5,913,957
[45] Date of Patent: Jun. 22, 1999

[54] SLITTING CHAMBER APPARATUS FOR BAGHOUSE FILTERS

[76] Inventors: Donald Pyron, 2315 Edgewood; Henry M. Pyron, 1904 W. Elm, both of El Dorado, Ark. 71730

[21] Appl. No.: 08/383,498

[22] Filed: Feb. 1, 1995

Related U.S. Application Data

[63] Continuation-in-part of application No. 08/067,823, May 27, 1993, Pat. No. 5,398,386.

[51] Int. Cl.$^6$ .................................................. B26F 1/26
[52] U.S. Cl. ............................................. 83/177; 83/144
[58] Field of Search ................................ 83/177, 53, 423, 83/471.3, 444, 946, 54; 29/402.07, 402.08, 452; 414/412; 451/87, 89

[56] References Cited

U.S. PATENT DOCUMENTS 4,152,958  5/1979  Bogert ................................. 83/177 X
4,686,877  8/1987  Jaritz et al. ......................... 83/177 X

*Primary Examiner*—Rinaldi I. Rada
*Attorney, Agent, or Firm*—Jerry L. Mahurin

[57] ABSTRACT

An apparatus for slitting baghouse filters from baghouse cages comprising a generally tubular cutting chamber having an inlet, an outlet and a plurality of angularly disposed conduits. A water knife for cutting the filtration bags, within the chamber, as the bags longitudinally pass therethrough is disposed in at least one of the conduits. The size and angle of the water knife is varied according to the material comprising the filter bag. The water knife can use any fluid but water is preferable. The water and tubular chamber act to suppress dispersion of material captured in the bag. The water contaminated with material carried by the bag can be directed to a proper disposal or collection area.

20 Claims, 3 Drawing Sheets

SLITTING CHAMBER APPARATUS FOR BAGHOUSE FILTERS

CROSS REFERENCE TO RELATED APPLICATION

This is a Continuation-in-Part of U.S. patent application Ser. No.: 08/067,823, Filing Date: May 27, 1993, entitled Process for Rejuvenating Baghouse Filter Cartridges (as amended), which issued as U.S. Pat. No. 5,398,386 on Mar. 21, 1995.

BACKGROUND OF THE INVENTION

PRIOR ART

The present invention broadly relates to baghouse filtration systems. Specifically, the present invention is an Apparatus for Slitting Baghouse Filters from Baghouse Cages. Art pertinent to the subject matter of the present invention can be found in U.S. Patent Classes 29 and 55.

Baghouses are employed to filter particulates from air expelled by various commercial processes. Some processes employ baghouses to remove hazardous wastes before venting to the atmosphere. Other processes use baghouses to gather output product.

Most modern baghouses employ a stainless steel skeletal framework, commonly referred to as a cage, to support filter bags. Together the cage and bag form a cartridge. Various mounting systems are used to anchor these cartridges in baghouse structures. Generally speaking, the cartridges are mounted to a tube sheet which is a flat plate with a plurality of cartridge receptive orifices defined in it. The cartridges may be clamped in place. Alternatively, a series of indents or notches defined in is flange around the opening mate with grooves or ribs defined in a shroud on the open end of the cage hold, the cartridge in place. The tube sheet is mounted in the baghouse in such a manner that it separates the input gases from the output gases. Gases to be filtered pass though the bags in one direction or the other, collecting material on the outside or the inside of the bag.

Innumerable patents are directed to baghouse configurations. Birkholz, U.S. Pat. No. 1,821,202, discloses a renewable capsule filter which employs a baghouse structure having a mesh frame. More conventional, modern baghouses are disclosed in several U.S. Patents. Dobyns, U.S Pat. No. 4,976,756, discloses a dust collector with a hinged roof to facilitate cleaning and use. Heffernan, U.S Pat. No. 4,309,200, discloses a baghouse with a collapsible filter bag assembly.

Some U.S. Patents speak directly to filter structures and the connections employed to secure the cartridge to the tube sheet. De Martino, U.S. Pat. No. 4,256,473, discloses a cylindrical collar unit used to attach a bag frame to the permanent baghouse structure. Gravley, U.S. Pat. No. 3,937,621, discloses a filter bag cuff. It is basically a ring folded within the fabric of the bag and stitched into place. Reinauer, U.S. Pat. No. 4,073,632, discloses a structure for mounting bags. This structure uses a semirigid bag with an integral framework. This patent discloses two end caps, one which allows the entrance of air and the other which supports the distant end of the bag. Miller, U.S. Pat. No. 4.042,3156, discloses a baghouse cell plate and filter bag attachment. Here a structure extends outward from the baghouse cell plate with a grove in it for accepting the upper lip of a filter bag. U.S. Pat. No. 4,424,070 issued to Robinson Jan. 3, 1984, discloses a dust collecting filter cartridge and attachment structure. The attachment structure is an adapter that uses a rubber clamp to mate dissimilarly sized cartridges and tube sheets.

Other patents speaking to baghouse filter structures include: Schaltenbrand, U.S. Pat. No. 4,157,901; Noland, U.S. Pat. No. 4,194,894; Bergquist, U.S. Pat. No. 4,257,790; Brown, U.S. Pat. No. 4,277,874, Nijhawan, U.S. Pat. No. 4,435,197; Reier, U.S. Pat. No. 4,618,353; Price, U.S. Pat. No. 5,017,200.

U.S. Pat. No. 5,095,607 issued to Simon on Mar. 17, 1992, discloses a tool for securing baghouse filters. It employs a tapered head to expand the open end flange of a baghouse filter cartridge the to facilitate inserting it into the tube sheet or other framework.

Various means are employed to clear the material from the bags in the baghouse. For example, Bundy, U.S. Pat. No. 4,113,449 discloses a two step process. First, the pressure of the gases flowing through the bags is reduced. Next the bags are blasted with high pressure gas to dislodge collected particles. Another method uses vibration. However, over time the bags become so heavily clogged with material that they must be replaced.

The first step in replacing the bags is removal of the cages mounting the filtration bags from the baghouse. Once removed from the baghouse, prior art methods for replacing bags require manually stripping or pulling the bags from the cages. Bent or damaged cages are generally discarded as scrap metal. This manual procedure has many drawbacks. For example, if the baghouse is intended to filter hazardous waste, the individuals stripping the bags are exposed directly to the waste in question. Therefore, cumbersome, expensive protective equipment is required. Additionally, cages are often bent during the stripping process. As a result, cages that would be perfectly serviceable, if a less forceful method was employed, are rendered scrap metal. The value of a cage as scrap metal, in comparison to the cost of a new cage, is minuscule. Finally, possibly the greatest drawback is labor cost. The man-hours involved in manually stripping bags are significant. While the filter cartridges are removed, the baghouse will not be operational. In some circumstances this can result in downtime for a significant portion, if not an entire, plant.

Hence, it is desirous to provide a method to strips the bag from the cage without damaging the cage. Preferably the bags will be stripped from the cages in such a way that direct contact with materials captured in the bags will be avoided. Furthermore, it is desirous to suppress dispersion of the material in the bags into the air. Finally, it would be beneficial if the process could be carried out in such a manner that downtime was reduced as well as costs generally.

SUMMARY OF THE INVENTION

Our Slitting Chamber Apparatus strips the bag from the cage without damage to the cage. In the preferred embodiment, a highly pressurized stream of water produced by a water knife is used to cut the bags. Hence, direct contact with materials captured in the bags is avoided. The water and associated mist will suppress dispersion of the material in the bags into the air. The apparatus allows retrofitting of the baghouse filters to proceed rapidly in an assembly line fashion to reduce downtime. Stripping of the bags is the first of three major steps in the retrofitting process the other steps required include: straightening and repairing bent cages and installation of new bags on the cages.

After they are removed from the baghouse, the cartridges are passed through the slitting chamber to cut the bag for removal from the cage. A water knife is angularly deployed in a wall of a tubular chamber with the output an appropriate distance from the surface of the bag. Using a water knife prevents damage to the cage and unnecessary disturbance of material captured in the bag. Water draining from the cutting chamber can be channeled to a hazardous waste disposal area if necessary. The angle of the water knife, distance from the bag and size of the water knife's jet can be varied according to the composition of the bags and the material impregnating them.

Preferably the equipment used to retrofit the baghouse is transported on and deployed in conjunction with a trailer. The trailer comprises several structures to accommodate the equipment. Particularly, a high pressure water pump and water tanks may be mounted on the trailer or transported on it to supply the water knife with high pressure water.

Therefore, a primary, object of the present invention is to provide a Slitting Chamber Apparattus for Baghouse Filters which allows the filter bags to be removed from their cages with minimum effort.

A related object of the present invention is to provide an apparatus which allows the bags to be removed with minimal disturbance of the substance captured in the material of the bag.

An object of the present invention is to provide an apparatus for rejuvenating baghouse cartridges which does not damage the baghouse cages.

A related object of the present invention is to provide an apparatus for stripping baghouse bags from baghouse cages without damaging the cage.

Another object of the present invention is to allow for removal of the baghouse bags with a minimum of physical contact by human beings.

Particularly, an object of the present invention is to provide a method to remove baghouse bags using water to suppress the dispersion of hazardous materials confined in the material of the bag.

An object of the present invention is to provide an apparatus for removing bags from cages using a water knife.

An object of the present invention is to provide an apparatus to minimize the number of man-hours necessary to retrofit baghouse filter cartridges.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
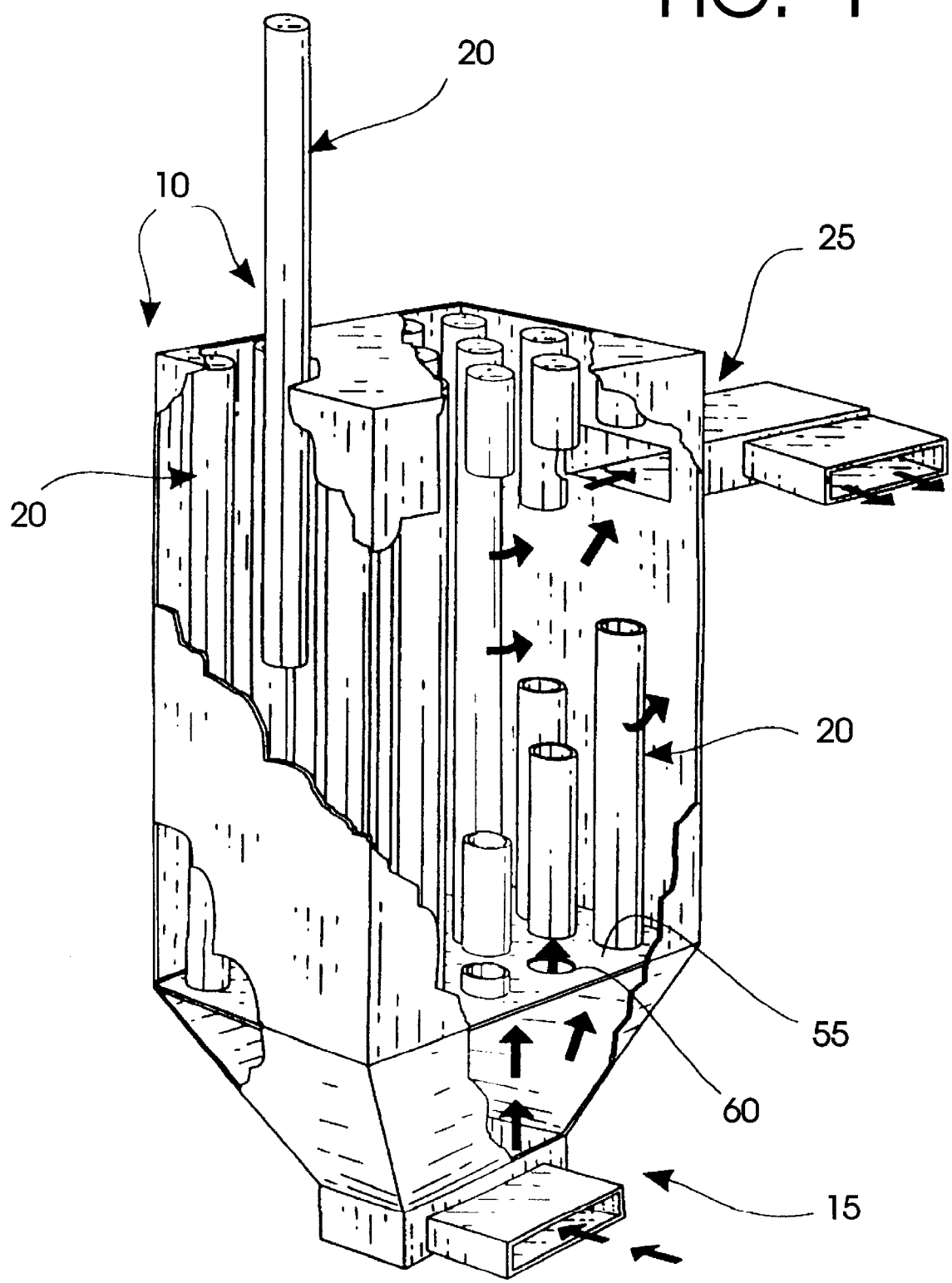
FIG. 1 is a diagrammatic, fragmented, partially exploded isometric view of a typical baghouse illustrating removal of a baghouse cartridge.

With reference now to the accompanying drawings, a typical baghouse, broadly designated by the reference numeral 10, is illustrated in FIG. 1. It generally comprises an inlet plenum 15 in air flow communication, through an array of cartridges 20, with an outlet plenum 25. Each cartridge 20 is comprised of a generally tubular, skeletal cage 30 (FIGS. 2 and 3) with a semipermeable filter bag 35 disposed over it. The cages 30 are usually constructed from stainless steel and are comprised of elongated, round longitudinal s₃pines 40 welded to generally circular hoops 45. Both the spines 40 and hoops 45 are constructed of relatively rigid stainless steel wire. One end of the cage 30 is usually capped by a circular plate 50. Various mounting systems are used to anchor cartridges 20 in baghouse structures 10. Generally speaking, the cages 30 are mounted to a tube sheet 55 (FIG. 1) which is a flat plate separating the inlet plenum 15 from the outlet plenum 25. The tube sheet 55 has a plurality of cage receptive orifices 60 defined in it. The cartridges 20 are usually either clamped in place or a series of indents in the tube sheet 55 mate with grooves defined in a shroud 70 on the cage 30 holding the cartridge 20 in place. The first step in retrofitting a baghouse 10 is to remove the cartridges 20 from the baghouse 10.

Figure 2:
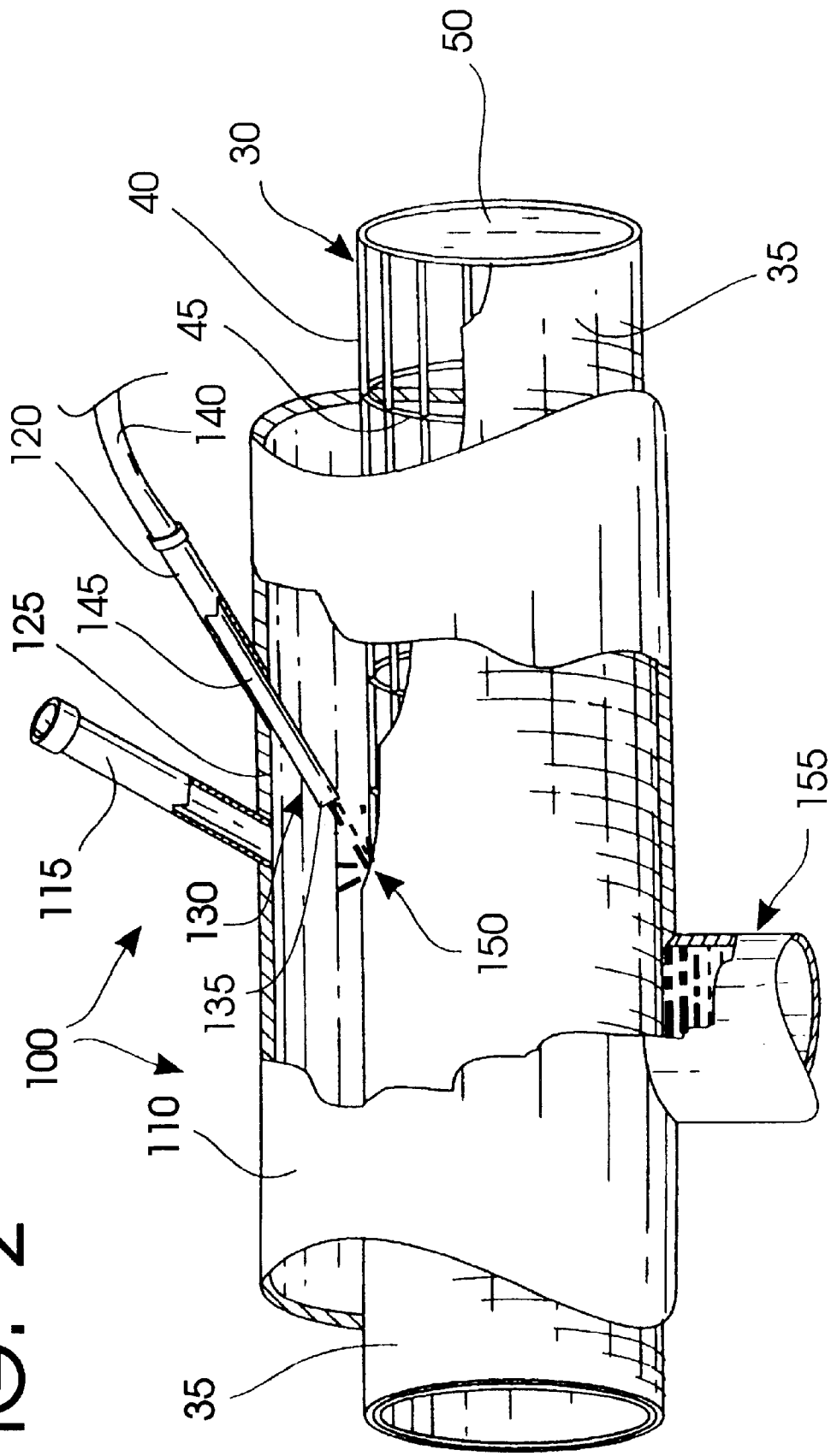
FIG. 2 is an isometric, environmental view of our Slitting Chamber in use.
Figure 3:
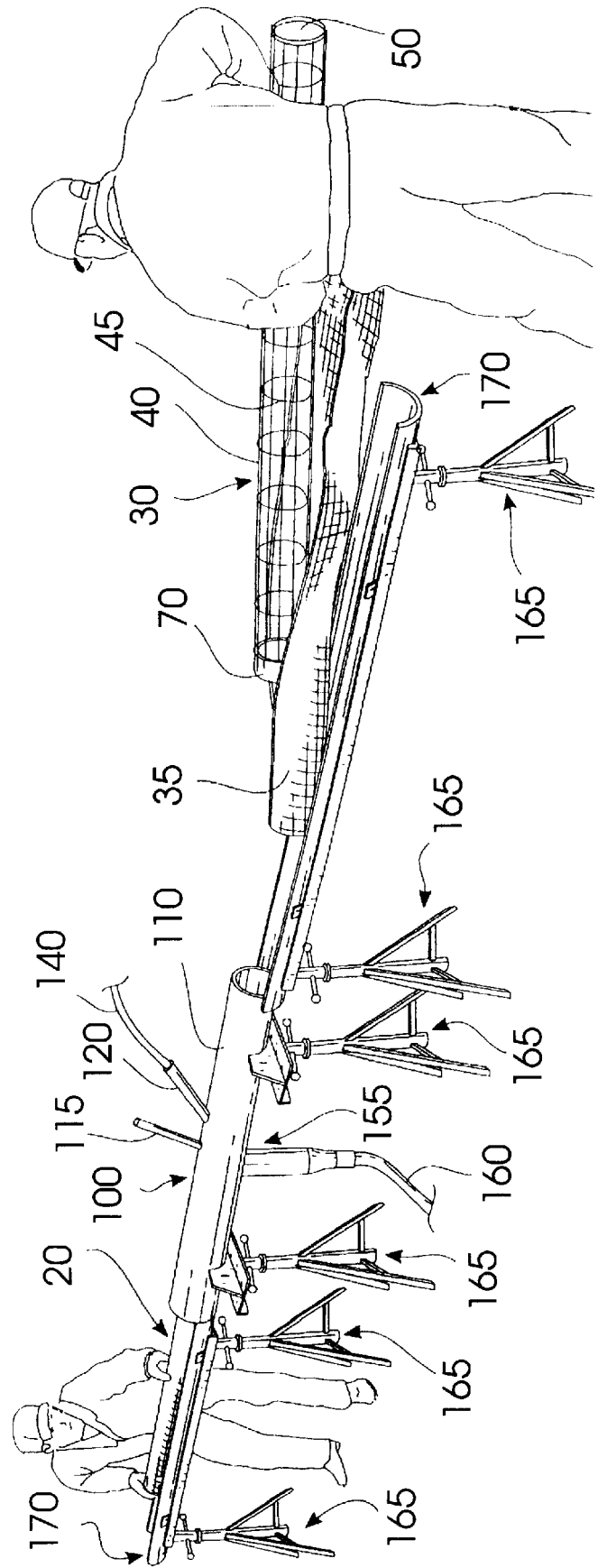
FIG. 3 is an enlarged, fragmented side elevational view of the preferred embodiment of our Slitting Chamber.

Next, as illustrated in FIGS. 2 and 3 the bags 35 are slit to remove them from the cages 30. The cartridges 20 are passed longitudinally through a cutting chamber 100 to slit the bags 35. The cutting chamber 100 is comprised of a generally tubular housing 110 of a diameter sufficient to allow passage of the cartridges 20. Two or more angularly disposed conduits 115, 120 pass through the wall 125 of the housing 110. A water knife 130 is mounted in the conduit disposed at the proper angle to cut the material comprising bags 35 being processed. The tip 135 of the water knife 130 is typically maintained approximately one-half inch from the bag 30. High pressure water is provided to the water knife 130 through a hose 140 hooked to a high pressure water pump. The water knife comprises a generally tubular body 145 threadably mounting a replaceable internal jet. The stream 150 from the water knife 130 contacts the material of the bag 35 and cuts it cleanly with minimum disturbance of the substance captivated in the bag 35 and without harming the cage 30. A drain 155 is provided for the cutting chamber 100 at its lower extreme. This drain 155 can be connected to an on site hazardous waste disposal area via a hose 160, if necessary. However, Very little run-off is produced. Once the bag 35 is slit it is removed from the cage 30 and properly disposed of in compliance with environmental regulations. Preferably, the cutting chamber 100 is set up on a plurality of variable height stands 165. Additionally, a trough 170 is preferably disposed at either end of the cutting chamber 100 on a set of stands 165 to facilitate passage of the cartridges 20 through the cutting chamber 100.

In its preferred embodiment the cutting chamber 100, high pressure pump and one or more water tanks are transported on and deployed in conjunction with a trailer.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense. For example, the use of very high pressure air can be employed to slit filter bags. Also, the use of a water knife to cut baghouse filters is possible without the use of a chamber where it is not necessary to confine the substance captured in the bag. Finally it is possible to employ any fluid steam of sufficiently narrow width and strength to cut filter bags.

What is claimed:

1. An apparatus for removing a filtration bag disposed on an elongated cage, said apparatus comprising:

a generally tubular housing having an inlet to receive said cage with said bag disposed over it and an outlet for the exit of said bag and cage;

high pressure fluid cutting means for rapidly slitting said filtration bag, said cutting means directing fluid through a nozzle body extending through a wall of said housing into said housing, as said bag and cage pass through said housing;

said nozzle body comprising a removable jet;

said jet being selectively replaced according to the material comprising said bag;

said high pressure fluid cutting means intersecting said housing at an angle, said angle varied according to the material comprising said bag; and, drain means for removing excess fluid from said housing.

2. The apparatus as defined in claim 1 wherein said housing further comprises a plurality of angularly disposed conduits disposed within a wall of said housing said conduits selectively receiving said high pressure fluid cutting means and disposing said cutting means at an angle appropriate to cut the material comprising said bag as rapidly as possible.

3. The apparatus as defined in claim 2 wherein said fluid is a liquid.

4. The apparatus as defined in claim 3 wherein said drain means comprises an opening defined in the lowest portion of said housing.

5. The apparatus as defined in claim 4 wherein said housing has a circular cross section.

6. The apparatus as defined in claim 5 wherein said liquid is water.

7. The apparatus as defined in claim 6 wherein said high pressure fluid cutting means comprises a water knife.

8. The apparatus as defined in claim 7 further comprising troughs extending longitudinally from said housing to facilitate feeding said cage and said bag into said inlet and out of said outlet.

9. For a baghouse filter cartridge comprising a filtration bag disposed on an elongated cage, a slitting chamber apparatus for removing said filtration bag from said cage without damaging said cage, said apparatus comprising:

a generally tubular housing, said housing comprising:
      an inlet for receiving said cartridge;
      an outlet for the exit of said bag and said cage;
      at least one angularly disposed conduit disposed within a wall of said housing for receiving high pressure fluid cutting means for rapidly cutting said bag; and,
      drain means for collecting and directing excess fluid out of said housing;
   said high pressure fluid cutting means comprising a body disposed within said conduit and a replaceable jet disposed within said body; and, high pressure fluid supply means for directing high pressure fluid through said jet to form an angularly disposed high pressure stream for contacting and rapidly cutting said bag without damaging said cage.

10. The apparatus as defined in claim 9 wherein said housing comprises a plurality of angularly disposed conduits, said conduits selectively receiving said cutting means and disposing said cutting means at an angle appropriate to cut the material comprising said bag as rapidly as possible.

11. The apparatus as defined in claim 10 wherein said fluid is a liquid.

12. The apparatus as defined in claim 11 wherein said drain means comprises an opening defined in the lowest portion of said housing.

13. The apparatus as defined in claim 12 wherein said housing has a circular cross section.

14. The apparatus as defined in claim 13 wherein said liquid is water and said cutting means comprises a water knife.

15. The apparatus as defined in claim 14 further comprising troughs extending longitudinally from said housing to facilitate feeding said cage and said bag into said inlet and out of said outlet.

16. For a baghouse filter cartridge comprising a filtration bag disposed on an elongated cage, a slitting chamber apparatus for removing said filtration bag from said cage without damaging said cage, said apparatus comprising:

a generally tubular housing, said housing comprising:
      an inlet for receiving said cartridge;
      an outlet for the exit of said bag and said cage;
      at least one angularly disposed conduit disposed within a wall of said housing for receiving a water knife for rapidly cutting said bag; and,
      a drain disposed within a lowest portion of said housing for collecting and directing excess water out of said housing;
   said water knife comprising a body disposed within said conduit and a replaceable jet disposed within said body, and, a high pressure pump in fluid flow communication with said water knife for providing high pressure water to said knife for directing through said jet to form an angularly disposed high pressure stream for contacting and cutting said bag without cutting said cage.

17. The apparatus as defined in claim 16 wherein said housing comprises a plurality of angularly disposed conduits, said conduits selectively receiving said water knife and disposing said water knife at an angle appropriate to cut the material comprising said bag as rapidly as possible.

18. The apparatus as defined in claim 17 wherein said housing has a circular cross section.

19. The apparatus as defined in claim 18 further comprising a drainage hose coupled to said opening for conveying excess liquid to an appropriate area.

20. The apparatus as defined in claim 19 further comprising troughs extending longitudinally from said housing to facilitate feeding said cage and said bag into said inlet and out of said outlet.

* * * * *